US012118936B2

(12) United States Patent
Byun et al.

(10) Patent No.: US 12,118,936 B2
(45) Date of Patent: Oct. 15, 2024

(54) PIXEL CIRCUIT AND DRIVING METHOD THEREOF AND DISPLAY PANEL HAVING THE SAME

(71) Applicants: Electronics and Telecommunications Research Institute, Daejeon (KR); IUCF-HYU (Industry-University Cooperation Foundation Hanyang University), Seoul (KR)

(72) Inventors: Chun Won Byun, Daejeon (KR); Chan Mo Kang, Daejeon (KR); Nam Sung Cho, Daejeon (KR); Byong Deok Choi, Seoul (KR); Yong Duck Kim, Seoul (KR)

(73) Assignees: ELECTRONICS AND TELECOMMUNICATIONS RESEARCH INSTITUTE, Daejeon (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 18/119,635

(22) Filed: Mar. 9, 2023

(65) Prior Publication Data

US 2023/0290306 A1 Sep. 14, 2023

(30) Foreign Application Priority Data

Mar. 11, 2022 (KR) ........................ 10-2022-0030745

(51) Int. Cl.

*G09G 3/3233* (2016.01)
*G09G 3/20* (2006.01)

(52) U.S. Cl.

CPC ......... *G09G 3/3233* (2013.01); *G09G 3/2007* (2013.01); *G09G 3/2096* (2013.01);
(Continued)

(58) Field of Classification Search

CPC ............... G09G 3/3233; G09G 3/2007; G09G 2300/0465; G09G 2300/0819;
(Continued)

(56) References Cited

U.S. PATENT DOCUMENTS 6,841,948 B2 1/2005 Yoshida
2006/0132193 A1* 6/2006 Tsuchi ................ H03F 3/45179 327/65
(Continued)

FOREIGN PATENT DOCUMENTS

KR 10-2006-0070709 6/2006
KR 10-1613737 4/2016
(Continued)

*Primary Examiner* — Matthew A Eason
*Assistant Examiner* — Sujit Shah
(74) *Attorney, Agent, or Firm* — KILE PARK REED & HOUTTEMAN PLLC

(57) ABSTRACT

A pixel circuit may comprise: a first transistor having a first terminal connected to a data line and to which a data signal is applied and a gate terminal connected to a scan line and to which a scan signal is applied; a third transistor having a gate terminal connected to a second terminal of the first transistor and a second terminal connected to a light emitting device; a capacitor having a second terminal commonly connected to the second terminal of the first transistor and the gate terminal of the third transistor; and a second transistor having a second terminal commonly connected to a first terminal of the capacitor and a first terminal of the third transistor, a first terminal connected to a first power supply voltage, and a gate terminal connected to an emission line to which an emission signal is applied.

20 Claims, 13 Drawing Sheets

(52) U.S. Cl.
CPC ............... *G09G 2300/0465* (2013.01); *G09G 2300/0819* (2013.01); *G09G 2300/0852* (2013.01); *G09G 2300/0861* (2013.01); *G09G 2310/0202* (2013.01); *G09G 2310/08* (2013.01); *G09G 2330/028* (2013.01)

(58) Field of Classification Search
CPC ... G09G 2300/0852; G09G 2300/0861; G09G 2300/0202; G09G 2310/08; G09G 2330/028
See application file for complete search history.

(56) References Cited

U.S. PATENT DOCUMENTS

| | | | | |
|---|---|---|---|---|
| 2006/0132410 | A1 | 6/2006 | Woo et al. | |
| 2006/0146827 | A1* | 7/2006 | Kim | G09G 3/3216 370/392 |
| 2016/0351125 | A1* | 12/2016 | Zhou | G09G 3/3291 |
| 2020/0111404 | A1 | 4/2020 | Kim et al. | |
| 2021/0166635 | A1* | 6/2021 | In | G09G 3/3275 |
| 2021/0193952 | A1* | 6/2021 | Shim | H10K 59/84 |

FOREIGN PATENT DOCUMENTS

| | | |
|---|---|---|
| KR | 10-1768480 | 8/2017 |
| KR | 10-2019-0084935 | 7/2019 |
| KR | 10-2020-0038735 | 4/2020 |

* cited by examiner

PIXEL CIRCUIT AND DRIVING METHOD THEREOF AND DISPLAY PANEL HAVING THE SAME

CROSS-REFERENCE TO RELATED APPLICATIONS

This application claims priority to Korean Patent Application No. 10-2022-0030745, filed on Mar. 11, 2022, with the Korean Intellectual Property Office (KIPO), the entire contents of which are hereby incorporated by reference.

BACKGROUND

1. Technical Field

The present disclosure relates to a pixel circuit usable for a display panel, and more particularly, to a pixel circuit having an internal compensation structure, a driving method thereof, and a display panel having the same.

2. Related Art

Most pixel circuits of light emitting devices for display such as organic light emitting diodes (OLEDs), micro light emitting diodes (micro-LEDs), and quantum dot LEDs (QLEDs) use a current driving method using semiconductor devices. The light emitting device includes various semiconductors such as an oxide semiconductor and an organic semiconductor as well as a silicon device as a semiconductor device. The current driving method refers to a method of adjusting the brightness of a light emitting device by adjusting the amount of current of a semiconductor device according to an input data voltage.

Most of the pixel circuits for light emitting devices use a current driving method. In the current driving method, the amount of current of a light emitting device is adjusted by adjusting an input voltage of a driving transistor of the pixel circuit. However, since the amount of current flowing through the light emitting device reacts sensitively to changes in electrical characteristics such as a threshold voltage and mobility of the driving transistor, a current difference occurs for each driving transistor.

Since this current difference appears as a difference in amount of light emitted from the pixel circuit, it is seen as a stain on a display panel, and therefore, most of the pixel circuits for the light emitting device require a compensation method for the driving transistor. In particular, recently, since panels requiring high pixels per inch (PPI) are mainly used, pixel circuits must be implemented in a narrow area, and thus it is difficult to implement a high-resolution display panel in a small area using a light emitting device due to an increase in electrical characteristic mismatch between driving transistors.

SUMMARY

The present disclosure is directed to providing a pixel circuit capable of internal compensation, which can be effectively used in a large-area, high-resolution display panel such as a television, which is an output unit of an information technology (IT) device, as well as a small-area, high-resolution display panel such as a mobile display, a micro display, and the like, a driving method thereof, and a display panel having the same.

Also, the present disclosure is directed to providing a pixel circuit capable of internal compensation applicable to a light emitting device such as an organic light emitting diode (OLED), a micro light emitting diode (micro-LED), and a quantum dot LED (QLED), a driving method thereof, and a display panel having the same.

According to a first exemplary embodiment of the present disclosure, a pixel circuit, which is configured to supply a current to a light emitting device so that the light emitting device emits light of a desired grayscale, may comprise: a first transistor having a first terminal connected to a data line and to which a data signal is applied and a gate terminal connected to a scan line and to which a scan signal is applied; a third transistor having a gate terminal connected to a second terminal of the first transistor and a second terminal connected to the light emitting device; a capacitor having a second terminal commonly connected to the second terminal of the first transistor and the gate terminal of the third transistor; and a second transistor having a second terminal commonly connected to a first terminal of the capacitor and a first terminal of the third transistor, a first terminal connected to a first power supply voltage, and a gate terminal connected to an emission line to which an emission signal is applied.

In a pre-charge period of a single operation cycle period, the first transistor may be turned on by the scan signal, the second transistor may maintain a turned-on state by the emission signal, a gate voltage node of the third transistor may be charged with an initial voltage, and a source voltage node of the third transistor may be charged with the first power supply voltage.

In a threshold voltage sampling period following the pre-charge period of the single operation cycle period, the first transistor may maintain a turned-on state by the scan signal, the second transistor may be turned off by the emission signal, and the source voltage node may be discharged by a source follower until a voltage corresponding to a sum of absolute values of the initial voltage and the threshold voltage is reached or until the third transistor is turned off.

In a data input period following the threshold voltage sampling period of the single operation cycle period, the first transistor may maintain a turned-on state by the scan signal, the second transistor may maintain a turned-off state by the emission signal, the data signal may be applied to the gate terminal of the third transistor through the first transistor and the third transistor may maintain a turned-off state, coupling may occur by parasitic capacitors seen at the gate voltage node and the source voltage node, and the source voltage node may be charged with a source voltage reflecting the coupling by a data voltage supplied through the first transistor.

In a display period following the data input period of the single operation cycle period, the first transistor may be turned off by the scan signal, the second transistor may be turned on by the emission signal, the coupling may occur by the parasitic capacitors seen at the gate voltage node and the source voltage node, and a gate voltage of the gate voltage node may become a voltage reflecting two parasitic capacitor components at both ends of the capacitor by the first power supply voltage supplied through the second transistor.

A current flowing through the light emitting device according to the gate voltage may ha a coefficient having a sum of the capacitor and the parasitic capacitor as a denominator and the parasitic capacitor as a numerator in a threshold voltage component of the third transistor in an equation expressing the current.

The light emitting device may include at least one or more of an OLED, a micro-LED, and a QLED.

According to a second exemplary embodiment of the present disclosure, a method of driving a pixel circuit configured to supply a current to a light emitting device so that the light emitting device emits light of a desired grayscale may be provided. The pixel circuit may comprise: a first transistor having a first terminal connected to a data line and to which a data signal is applied and a gate terminal connected to a scan line and to which a scan signal is applied; a third transistor having a gate terminal connected to a second terminal of the first transistor and a second terminal connected to the light emitting device; a capacitor having a second terminal commonly connected to the second terminal of the first transistor and the gate terminal of the third transistor; and a second transistor having a second terminal commonly connected to a first terminal of the capacitor and a first terminal of the third transistor, a first terminal connected to a first power supply voltage, and a gate terminal connected to an emission line to which an emission signal is applied. The method may comprise: charging a gate voltage node of the third transistor with an initial voltage, and charging a source voltage node of the third transistor with the first power supply voltage; in a state in which the second transistor is turned off, discharging a source voltage of the source voltage node by a source follower until a voltage corresponding to a sum of absolute values of the initial voltage and the threshold voltage is reached or until the third transistor is turned off; and in a state in which the third transistor is turned off, when coupling occurs by parasitic capacitors seen at the gate voltage node and the source voltage node, charging the source voltage node with a source voltage reflecting the coupling between the capacitor and the parasitic capacitor by a data voltage supplied through the first transistor.

The method may further comprise: in a state in which the first transistor is turned off and the second transistor is turned on, when the coupling occurs by the parasitic capacitors seen at the gate voltage node and the source voltage node, causing a gate voltage of the gate voltage node to be a voltage reflecting the coupling by two parasitic capacitors of both ends of the capacitor by the first power supply voltage supplied through the second transistor.

The light emitting device may include at least one or more of an OLED, a micro-LED, and a QLED.

According to a third exemplary embodiment of the present disclosure, a display panel configured to output an image may comprise: a pixel unit in which a plurality of pixels are arranged; and a pixel circuit provided in a first pixel among the pixels, and configured to supply a current to a light emitting device so that the light emitting device belonging to the first pixel emits light of a desired grayscale, wherein the pixel circuit may comprise: a first transistor having a first terminal connected to a data line and to which a data signal is applied and a gate terminal connected to a scan line and to which a scan signal is applied; a third transistor having a gate terminal connected to a second terminal of the first transistor and a second terminal connected to the light emitting device; a capacitor having a second terminal commonly connected to the second terminal of the first transistor and the gate terminal of the third transistor; and a second transistor having a second terminal commonly connected to a first terminal of the capacitor and a first terminal of the third transistor, a first terminal connected to a first power supply voltage, and a gate terminal connected to an emission line to which an emission signal is applied.

The display panel may further comprise: a data driver configured to supply the data signal to the pixel unit; a gate driver configured to supply the scan signal to the pixel unit; and a timing controller configured to control operations of the data driver and the gate driver.

The data driver may apply, as the data signal, a pulse amplitude modulation (PAM) signal having a plurality of levels to the first terminal of the first transistor according to a grayscale required for the light emitting device coupled to each pixel.

The gate driver may apply, as the scan signal, a pulse width modulation (PWM) signal having a plurality of sub-frames in a single frame according to the grayscale to a control terminal of the first transistor, and a PAM signal of any one level selected from the PAM signal may be applied to the gate terminal of the third transistor configured to supply a grayscale current to the light emitting device during a corresponding sub-frame.

The number of output channels of a decoder provided in the data driver may be smaller than the number of grayscales that is expressed with predetermined bits.

In a pre-charge period of a single operation cycle period of the first pixel, the first transistor may be turned on by the scan signal, the second transistor may maintain a turned-on state by the emission signal, a gate voltage node of the third transistor may be charged with an initial voltage, and a source voltage node of the third transistor may be charged with the first power supply voltage.

In a threshold voltage sampling period following the pre-charge period of the single operation cycle period, the first transistor may maintain a turned-on state by the scan signal, the second transistor may be turned off by the emission signal, and the source voltage node may be discharged by a source follower until a voltage corresponding to a sum of absolute values of the initial voltage and the threshold voltage is reached or until the third transistor is turned off.

In a data input period following the threshold voltage sampling period of the single operation cycle period, the first transistor may maintain a turned-on state by the scan signal, the second transistor may maintain a turned-off state by the emission signal, the data signal may be applied to the gate terminal of the third transistor through the first transistor and the third transistor is turned-off, coupling may occur by parasitic capacitors seen at the gate voltage node and the source voltage node, and the source voltage node may be charged with a source voltage reflecting the coupling with the parasitic capacitor by a data voltage supplied through the first transistor.

In a display period following the data input period of the single operation cycle period, the first transistor is turned off by the scan signal, the second transistor may be turned on by the emission signal, the coupling may occur by the parasitic capacitors seen at the gate voltage node and the source voltage node, and a gate voltage of the gate voltage node may become a voltage reflecting the coupling at both ends of the capacitor by the first power supply voltage supplied through the second transistor.

The light emitting device may include at least one or more of an OLED, a micro-LED, and a QLED.

According to the present disclosure, it is possible to provide a pixel circuit capable of internal compensation suitable not only for large-area and high-resolution display panels such as televisions and monitors, but also for small-area, high-resolution display panels such as mobile displays and micro displays.

In addition, according to the present disclosure, it is possible to provide a pixel circuit capable of internal compensation of a new structure that may be widely and effectively applied to various products or applications of light emitting devices such as an organic light emitting diode (OLED), a micro light emitting diode (micro-LED), and a quantum dot LED (QLED), a driving method thereof, and a display panel using the same.

DETAILED DESCRIPTION OF THE EMBODIMENTS

Figure 1:
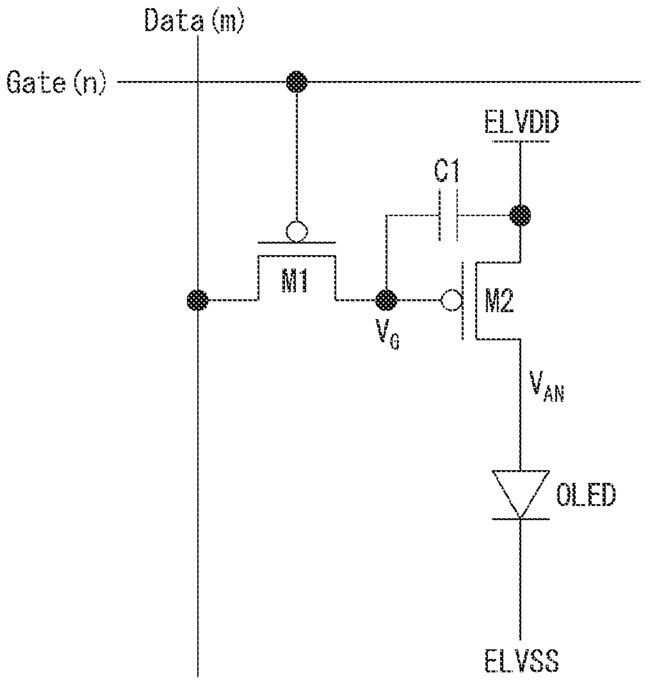
FIG. 1 is a circuit diagram of a basic pixel circuit.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

Figure 2:
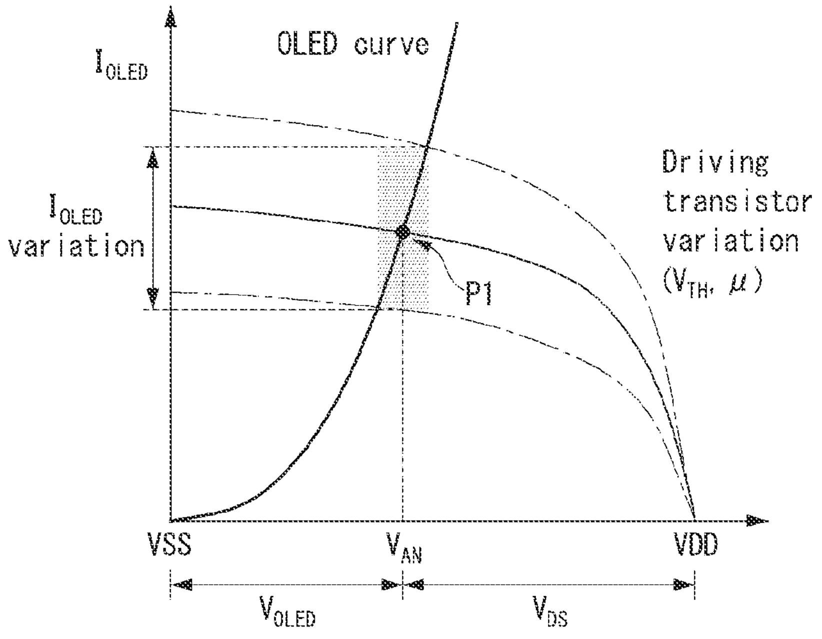
FIG. 2 is a graph showing a change in OLED current according to a change in characteristics of a driving transistor in the pixel circuit of FIG. 1.

FIG. 1 is a circuit diagram of a basic pixel circuit. FIG. 2 is a graph showing a change in organic light emitting diode (OLED) current according to a change in characteristics of a driving transistor in the pixel circuit of FIG. 1.

Referring to FIG. 1, the basic pixel circuit includes two transistors M1 and M2 and one capacitor C1. Here, a light emitting device EL and a driving transistor M2 are connected in series between a high-level power voltage ELVDD and a low-level power voltage ELVSS, and a gate of the driving transistor M2 is commonly connected to a second terminal of a switching transistor M1 and a second terminal of the capacitor C1. In addition, a first terminal of the switching transistor M1 is connected to an m (arbitrary natural number)-th data line in a display panel, a gate of the switching transistor M1 is connected to an n (arbitrary natural number)-th gate line in the display panel, a first terminal of the capacitor C1 and a first terminal of the driving transistor M2 are commonly connected to the high-level power supply voltage ELVDD line, an anode of a light emitting device (e.g., OLED) is connected to a second terminal of the driving transistor M2, and a cathode of the light emitting device is connected to the low level power supply voltage ELVSS line.

Compared to the pixel circuit of the present exemplary embodiment (see FIG. 9) described below, the pixel circuit requires a low current level of picoampere (pA) in the driving transistor M2 and it is very difficult to adjust grayscale due to a variation in characteristics of a driving transistor device, leakage current, noise, and the like when a low grayscale current designed with a relatively small weight flows.

A high grayscale current ($I_{EM\ highgray}$) in a saturation region of the driving transistor M2 may be expressed as Equation 1, and a low grayscale current may be expressed as Equation 2.

$$I_{EM\ highgray} = \mu C_{OX}\frac{W}{L}(V_{GS} - V_{TH})^2 \quad \text{[Equation 1]}$$

$$I_{EM\ lowgray} = \mu C_{OX}\frac{W}{L}V_T^2\exp\left(\frac{V_{GS} - V_{TH}}{\eta V_T}\right) = I_0\exp\left(\frac{V_{GS} - V_{TH}}{\eta V_T}\right) \quad \text{[Equation 2]}$$

In Equations 1 and 2, μ represents an electron mobility of the driving transistor M2, $C_{OX}$ represents an oxide capacitance per unit area of an oxide film of the driving transistor M2, W and L represent a channel width and a channel length of the driving transistor M2, $V_{GS}$ represents a gate-source (first terminal) voltage of the driving transistor M2, $V_{TH}$ represents a threshold voltage of the driving transistor M2, $V_T$ represents a thermal voltage of an OLED, and η represents a value obtained by dividing the sum of $C_{OX}$ and $C_{DEP}$ of the driving transistor M2 by $C_{OX}$, respectively. Here, $C_{DEP}$ means a capacitance due to a depletion region of a semiconductor.

As shown in FIG. 2, an anode voltage VAN of a light emitting device, as a voltage of a middle node P1 between a device voltage $V_{OLED}$ applied to both ends of the light emitting device and a voltage VDS between a source (first terminal) and a drain (second terminal) of the driving transistor M2, may appear in the form of a light emitting device characteristic curve (OLED curve) that a change in a device current $I_{OLED}$ flowing through the light emitting device according to a characteristic variation due to the threshold voltage $V_{TH}$ and mobility μ of the driving transistor M2 shows that there is a variation in electrical characteristics of the driving transistor M2. That is, it is shown that the device current $I_{OLED}$ for a specific anode voltage VAN may have different levels according to the variation in characteristics of the driving transistor, thereby forming a range of device current $I_{OLED}$ variation.

In FIG. 2, VSS is a voltage of the ELVSS and VDD is a voltage of the ELVDD. The aforementioned light emitting device characteristic curve may be applied substantially the same to micro-LEDs and QLEDs in addition to OLEDs.

Thus, when an internal compensation structure is added in a basic pixel circuit so that a relatively constant device current is generated for a specific anode voltage despite a characteristic variation of the driving transistor, the pixel circuit according to the present exemplary embodiment described later is configured to be implemented as a pixel circuit having a relatively small size compared to other conventional internal compensable pixel circuits.

Hereinafter, some comparative examples of conventional pixel circuits will be described first.

Figure 3:
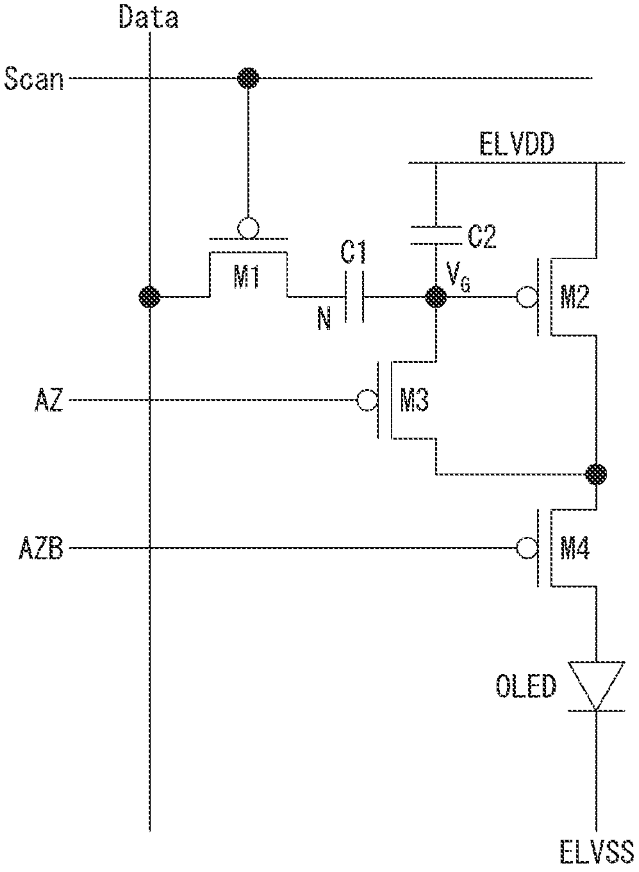
FIG. 3 is an exemplary diagram of a pixel circuit of a first comparative example.
Figure 4:
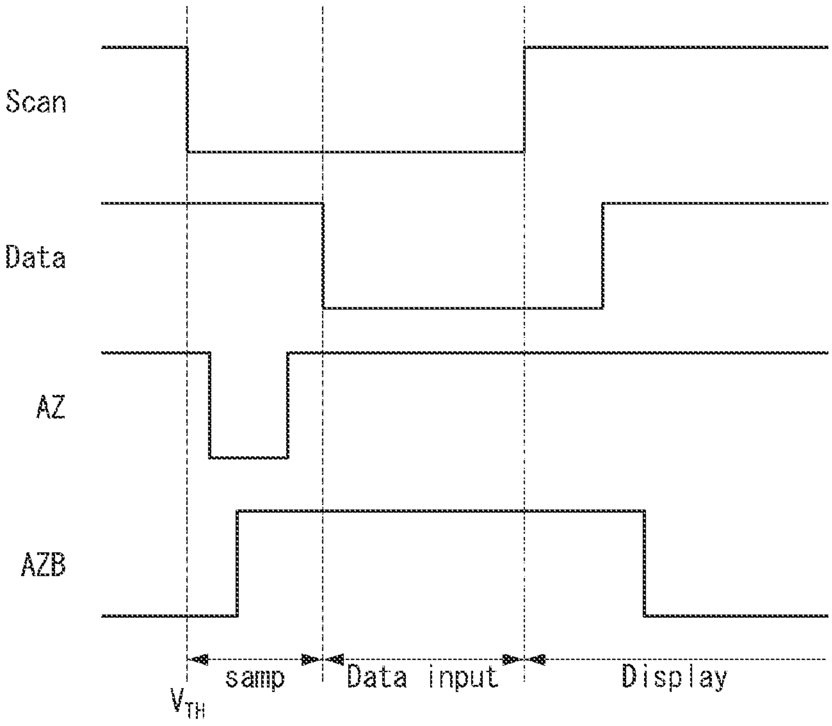
FIG. 4 is a timing diagram of the pixel circuit of FIG. 3.

FIG. 3 is an exemplary diagram of a pixel circuit of a first comparative example. FIG. 4 is a timing diagram of the pixel circuit of FIG. 3.

Referring to FIG. 3, the pixel circuit of the first comparative example is a pixel circuit capable of internal compensation and includes four transistors M1, M2, M3, and M4 and two capacitors C1 and C2. Further, two signals AZ and AZB having active levels and inactive levels are configured to be selectively applied to gates of third and fourth transistors M3 and M4, respectively.

As shown in FIG. 4, the pixel circuit operates through three-step periods. First, in a $V_{TH}$ sampling period, the first to third transistors M1, M2, and M3 are turned on, and ELVDD is applied to an N-node at both ends of a first capacitor C1, and a voltage obtained by subtracting a threshold voltage $V_{TH}$ from ELVDD is applied to a gate voltage $V_G$ node, and thus the threshold voltage is sampled.

Next, when the third transistor M3 is turned off in a data input period, a data voltage $V_{DATA}$ enters the N-node through the first transistor M1 and is transmitted to the gate voltage $V_G$ node through the first capacitor C1, and thus the N-node has the data voltage $V_{DATA}$, and the gate voltage node has a voltage $V_{DATA}$-$V_{TH}$ obtained by subtracting the threshold voltage from the data voltage.

Next, in a display period, when the first transistor M1 is turned off and the fourth transistor M4 is turned on, the driving transistor M2 generates a current held by the gate voltage node according to the data, and a light emitting device (e.g., OLED) is turned on.

The pixel circuit is capable of compensating the threshold voltage $V_{TH}$, but a compensable time is short, and a compensation rate is determined by a ratio of two capacitors. However, since a size or area of one capacitor is larger than a size or area of a transistor normally used as a switch, it is not suitable for a small-area panel.

Figure 5:
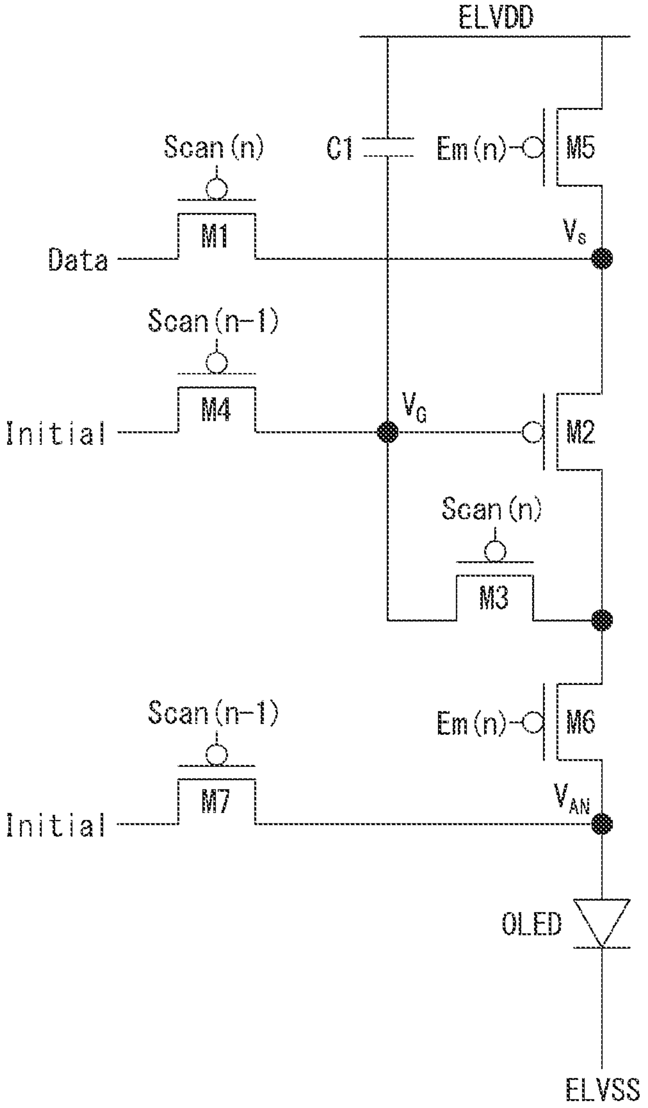
FIG. 5 is an exemplary diagram of a pixel circuit of a second comparative example.
Figure 6:
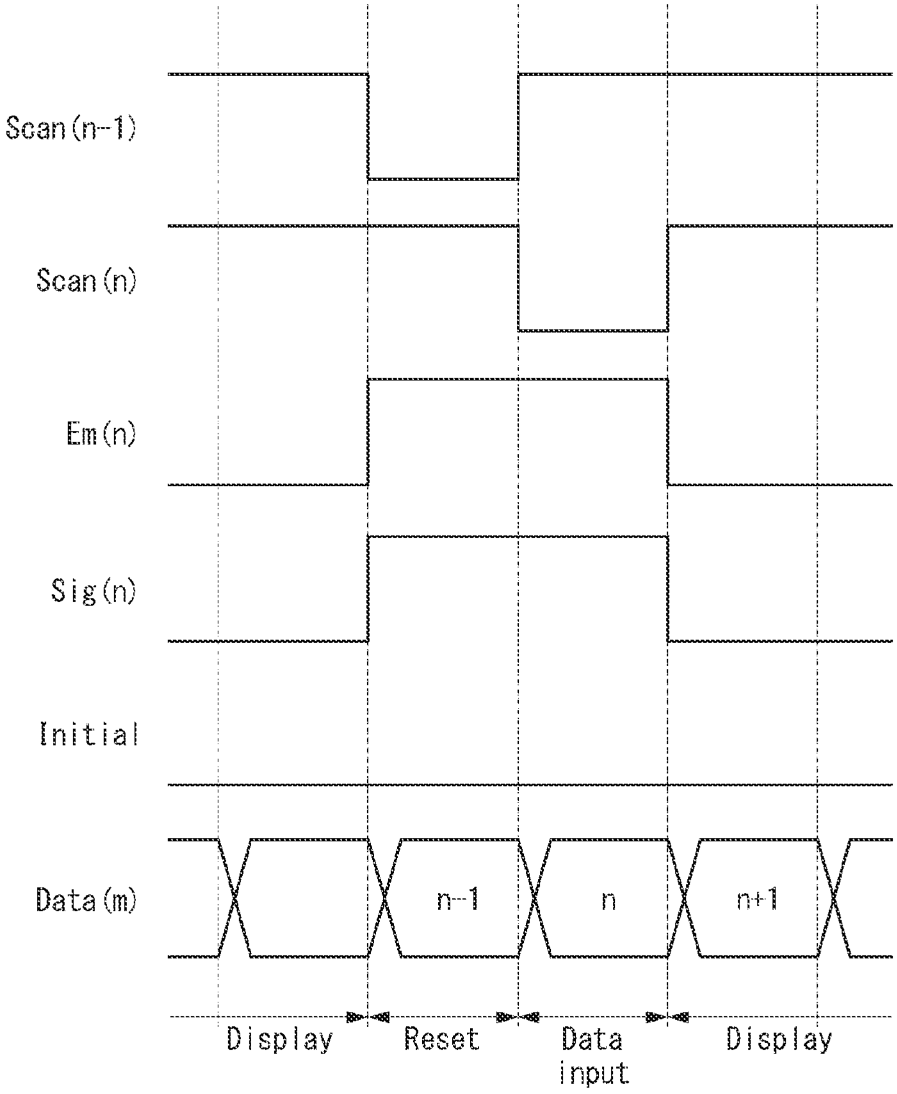
FIG. 6 is a timing diagram of the pixel circuit of FIG. 5.

FIG. 5 is an exemplary diagram of a pixel circuit of a second comparative example. FIG. 6 is a timing diagram of the pixel circuit of FIG. 5.

Referring to FIG. 5, the pixel circuit of the second comparative example is a representative internal compensation pixel circuit, and includes seven transistors M1, M2, M3, M4, M5, M6, and M7 and one capacitor C1. The coupling relationship between the seven transistors M1, M2, M3, M4, M5, M6, and M7 and the one capacitor C1 is as shown in the circuit diagram of FIG. 6.

In the pixel circuit, a gate of a first transistor M1 and a gate of a third transistor M3 are connected to a current scan line Scan(n), which is an n (arbitrary natural number)-th scan line, a gate of a fourth transistor M4 and a gate of a seventh transistor M7 are connected to a previous (n−1)th scan line Scan(n−1) located adjacent to the n-th scan line, and a gate of a fifth transistor M5 and a gate of a sixth transistor M6 are connected to an n-th emission line EM(n) corresponding to an auxiliary scan line or an auxiliary gate line.

As shown in FIG. 6, the pixel circuit operates through three-step periods. First, when the fourth transistor M4 and the seventh transistor M7 are turned on in a reset period, a gate voltage $V_G$ node and an anode voltage VAN node are reset to an initial voltage.

Next, in a data input period, when the fourth transistor M4 and the seventh transistor M7 are turned off and the first to third transistors M1, M2, and M3 are turned on, the second transistor M2 is diode-connected, and thus the gate voltage $V_G$ node is charged up to a voltage obtained by subtracting a threshold voltage $V_{TH}$ from a data voltage $V_{DATA}$.

Next, in a display period, when the first and third transistors M1 and M3 are turned off and the fifth and sixth transistors M5 and M6 are turned on, the driving transistor M2 connected to the gate voltage node supplies a current to an OLED using a previously compensated data voltage.

Although the pixel circuit may compensate for the threshold voltage $V_{TH}$, it is not suitable for a small-area panel because it requires 7 transistors.

Figure 7:
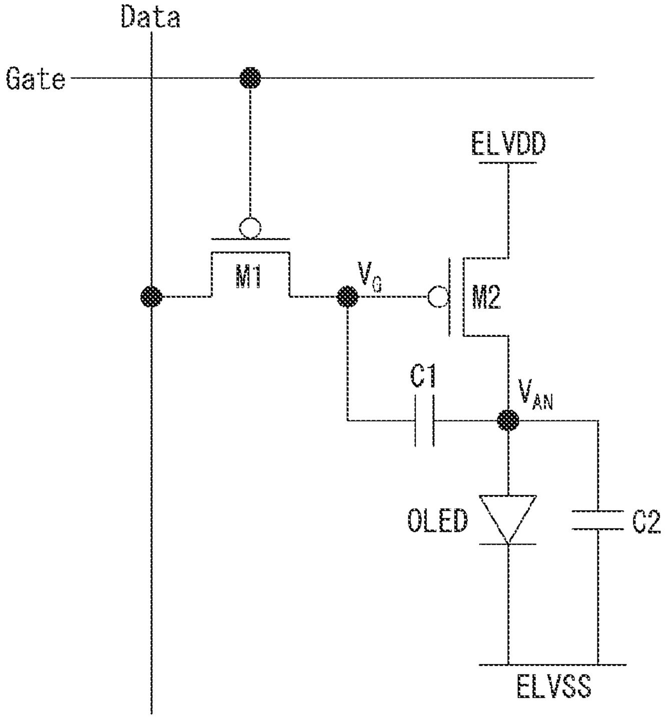
FIG. 7 is an exemplary diagram of a pixel circuit of a third comparative example.
Figure 8:
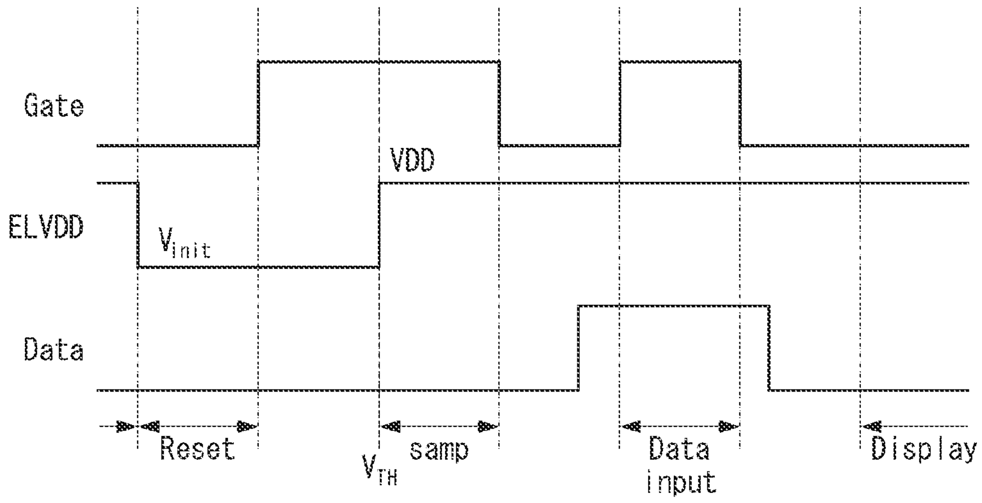
FIG. 8 is a timing diagram of the pixel circuit of FIG. 7.

FIG. 7 is an exemplary diagram of a pixel circuit of a third comparative example. FIG. 8 is a timing diagram of the pixel circuit of FIG. 7.

Referring to FIG. 7, the pixel circuit of the third comparative example includes two transistors M1 and M2 and two capacitors C1 and C2 as another internal compensation pixel circuit. The pixel circuit is substantially the same as the basic pixel circuit except for the configuration in which a second capacitor C2 is connected in parallel with a light emitting device OLED between an anode voltage VAN node and a low level power supply voltage ELVSS line.

As shown in FIG. 8, the pixel circuit operates through four-step periods. First, when a second transistor M2 is turned on in a reset period, the anode voltage VAN node is reset to an initial voltage $V_{init}$.

Next, when the first and second transistors M1 and M2 are turned on in a $V_{TH}$ sampling period, a power supply voltage VDD from a high-level power supply voltage ELVDD line for a light emitting device is applied to a gate voltage $V_G$ node so that the anode voltage node is charged up to a voltage obtained by subtracting a threshold voltage $V_{TH}$ from the power supply voltage VDD, and thus the threshold voltage $V_{TH}$ is sampled in the first capacitor C1.

Next, in a data input period, a data voltage $V_{DATA}$ is applied from a data line to the gate voltage $V_G$ node through the first transistor M1.

Finally, when the first transistor M1 is turned off and only the second transistor M2 is turned on in a display period, a device current corresponding to the anode voltage VAN of the second transistor M2, that is, the driving transistor flows to the OLED.

The pixel circuit may compensate for the threshold voltage $V_{TH}$, but the compensable time is short and two capacitors are required. Although there is an advantage to a small pixel circuit because a transistor is not added to the pixel circuit, a size of one capacitor added is larger than a size of one transistor usually used as a switch, so that it is not suitable for a small-area display panel due to the added capacitor. In addition, since the high level power supply voltage ELVDD must be controlled line-by-line, the high level power supply voltage ELVDD usually has a large capacitance, and thus power consumption is very large.

Figure 9:
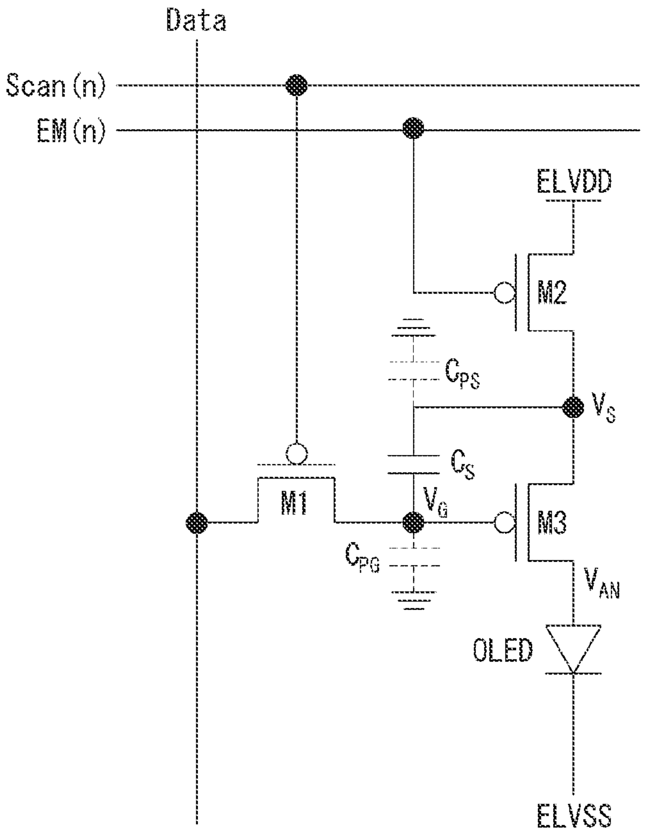
FIG. 9 is a circuit diagram of a pixel circuit according to one exemplary embodiment of the present disclosure.

FIG. 9 is a circuit diagram of a pixel circuit according to one exemplary embodiment of the present disclosure.

Referring to FIG. 9, the pixel circuit includes three transistors M1, M2 and M3, and one capacitor Cs. The pixel circuit of this exemplary embodiment has a circuit structure in which only one transistor is added as compared to the basic pixel circuit.

A first transistor M1 has a first terminal, a second terminal, and a gate terminal. The first terminal of the first transistor M1 may be connected to an m (arbitrary natural number)-th data line Data(m) in a display panel. The second terminal of the first transistor M1 is commonly connected to a gate terminal of a third transistor M3 and a second terminal of the capacitor Cs. The gate terminal of the first transistor M1 may be connected to an n (arbitrary natural number)-th scan line Scan(n).

A second transistor M2 has a first terminal, a second terminal, and a gate terminal. The first terminal of the second transistor M2 is connected to a first power supply voltage ELVDD line, and the second terminal of the second transistor M2 is commonly connected to a first terminal of the third transistor M3 and a first terminal of the capacitor Cs, and the gate terminal of the second transistor M2 may be connected to the n-th emission line EM(n) in the display panel.

The third transistor M3, as a driving transistor, has a first terminal, a second terminal, and a gate terminal. The first terminal of the third transistor M3 is commonly connected to the second terminal of the second transistor M2 and the first terminal of the capacitor Cs. This common connection node may be referred to as a source voltage $V_S$ node. The second terminal of the third transistor M3 is connected to an anode terminal of a light emitting device. A voltage at the second terminal of the third transistor M3 or the anode terminal of the light emitting device may be referred to as an anode voltage VAN. In addition, the gate terminal of the third transistor M3 is commonly connected to the second terminal of the first transistor M1 and the second terminal of the capacitor Cs. This common connection node may be referred to as a gate voltage $V_G$ node.

The capacitor Cs may be referred to as a first capacitor to be distinguished from a parasitic capacitor described below.

Alight emitting device has an anode terminal (simply referred to as an anode) and a cathode terminal (simply referred to as a cathode). The anode of the light emitting device is connected to the second terminal of the third transistor M3, and the cathode of the light emitting device is connected to a second power supply voltage ELVSS line. A potential of the second power supply voltage ELVSS is lower than that of the first power supply voltage ELVDD. In this exemplary embodiment, an OLED is exemplified as a light emitting device, but is not limited thereto, and any one selected from a micro-LED, a QLED, and the like may be used.

The aforementioned first transistor M1 and second transistor M2 may operate as switching transistors, and the third transistor M3 may operate as a current source supplying a current to a light emitting device such as an OLED. In the present exemplary embodiment, the first to third transistors M1, M2, and M3 are illustrated as being P-type field effect transistors (e.g., PMOS), but the present disclosure is not limited thereto, and it is also possible to properly utilize N-type metal oxide semiconductor (MOS) transistors.

The aforementioned m-th data line may be any one of a plurality of data lines extending apart from each other in a first direction of a display panel, and the n-th scan line may be any one of a plurality of scan lines extending apart from each other in a second direction substantially orthogonal to the first direction of the display panel. In addition, an n-th emission line may be any one of a plurality of emission lines extending apart from each other in the second direction of the display panel. The plurality of data lines and the plurality of scan lines may be arranged to correspond to a plurality of pixel circuit regions arranged in a matrix form on the display panel.

In the pixel circuit of the present exemplary embodiment, a predetermined source voltage is formed at the source voltage node using coupling generated by parasitic capacitors seen at the gate voltage $V_G$ node and the source voltage $V_S$ node in a state in which the first transistor M1 is turned on and the second transistor M2 is turned off, and a predetermined gate voltage having a compensation function is applied to the gate voltage node using coupling generated by the parasitic capacitors seen at the gate voltage $V_G$ node and the source voltage $V_S$ node in a state in which the first transistor M1 is turned off and the second transistor M2 is turned on.

The parasitic capacitors may include a parasitic capacitor Cps that is present between the source voltage $V_S$ node and the ground and a parasitic capacitor $C_{PG}$ that is present between the gate voltage $V_G$ node and the ground. The coupling is formed between the capacitor Cs provided in the pixel circuit and a conductive ground plane of a semiconductor device forming the pixel circuit, and may be expressed as a parasitic capacitor component.

The operation of the pixel circuit of this exemplary embodiment may be explained by dividing a single operation cycle period of the pixel circuit into four periods. The four periods include a pre-charge period, a $V_{TH}$ sampling period, a data input period, and a display period (see FIG. 10). Operation processes of each period are described in more detail as shown in FIGS. 10 to 16 below.

Figure 10:
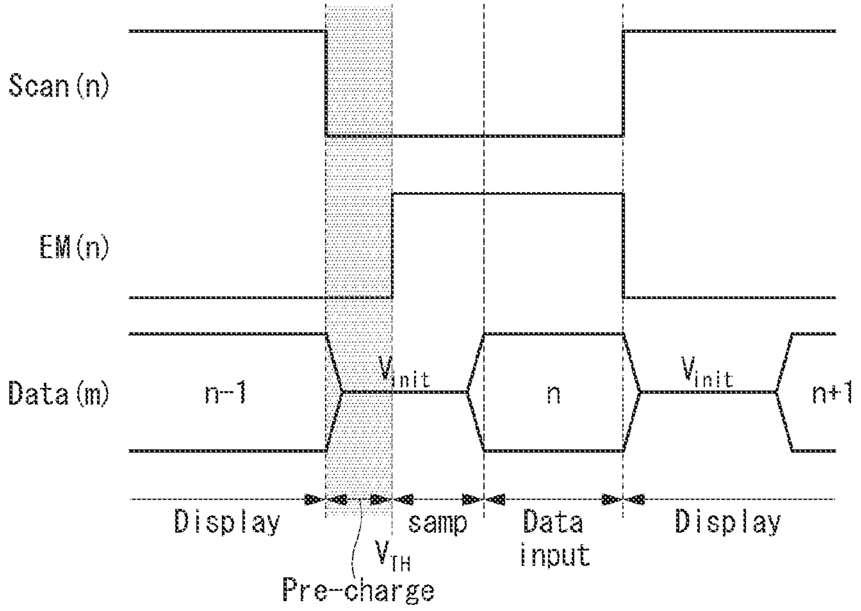
FIG. 10 is a timing diagram for describing an operating principle of the pixel circuit of FIG. 9 in the pre-charge period.

FIG. 10 is a timing diagram for describing an operating principle of the pixel circuit of FIG. 9 in the pre-charge period.

Referring to FIG. 10, in the pre-charge period, when the scan signal is converted from a high level to a low level in the n-th scan line Scan(n), and the emission signal is maintained at a low level in the n-th emission line EM(n), the first to third transistors M1, M2, and M3 are turned on.

At this time, pre-charge is performed on the gate voltage $V_G$ node and the source voltage $V_S$ node. At this time, the $V_G$ node is charged with the initial voltage $V_{init}$, and the $V_S$ node is charged with the first power supply voltage ELVDD.

Here, the low level refers to a voltage level capable of turning on corresponding transistors when applied to the gate terminals of the first and second transistors M1 and M2 having a PMOS structure, and the high level refers to a voltage level capable of turning off the first and second transistors M1 and M2 having the PMOS structure.

Figure 11:
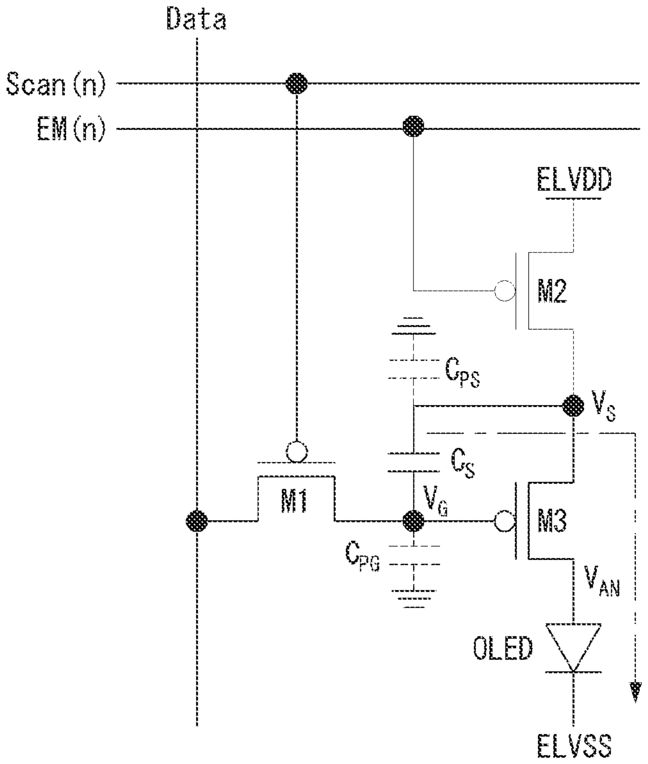
FIG. 11 is a circuit diagram for describing an operating principle of the pixel circuit of FIG. 9 in the $V_{TH}$ sampling period.
Figure 12:
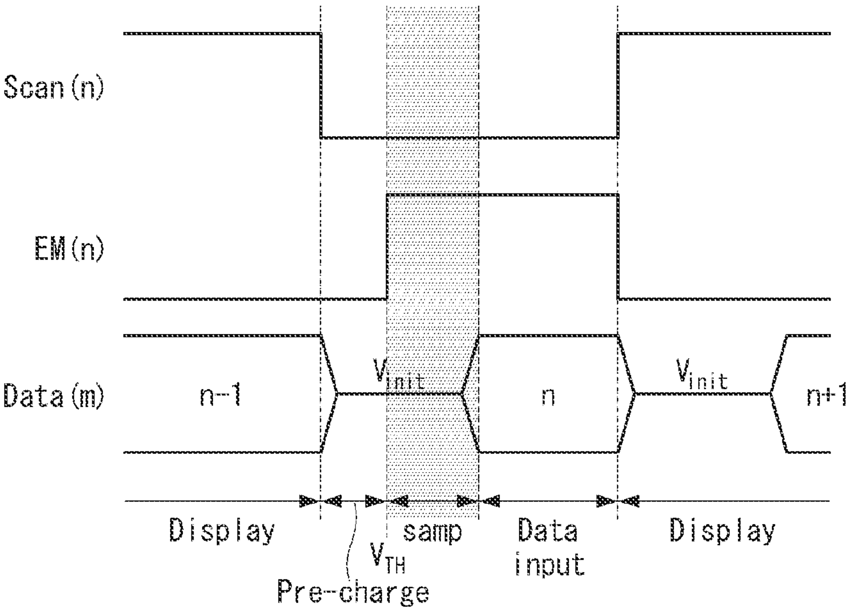
FIG. 12 is a timing diagram for describing an operating principle of the pixel circuit of FIG. 11 in the $V_{TH}$ sampling period.

FIG. 11 is a circuit diagram for describing an operating principle of the pixel circuit of FIG. 9 in the $V_{TH}$ sampling period. FIG. 12 is a timing diagram for describing an operating principle of the pixel circuit of FIG. 11 in the $V_{TH}$ sampling period.

Referring to FIGS. 11 and 12, when the scan signal is maintained at a low level and the emission signal is switched from a low level to a high level in the $V_{TH}$ sampling period, the first transistor M1 maintains a turned-on state and the second transistor M2 is turned off.

At this time, the source voltage $V_S$ of the source voltage node is discharged by a source follower to a voltage $V_{init}$+$V_{TH}$ obtained by summing absolute values of the initial voltage $V_{init}$ and the threshold voltage $V_{TH}$ through a path passing through the third transistor M3 and the light emitting device. Accordingly, the threshold voltage $V_{TH}$ is stored in the capacitor Cs.

Figure 13:
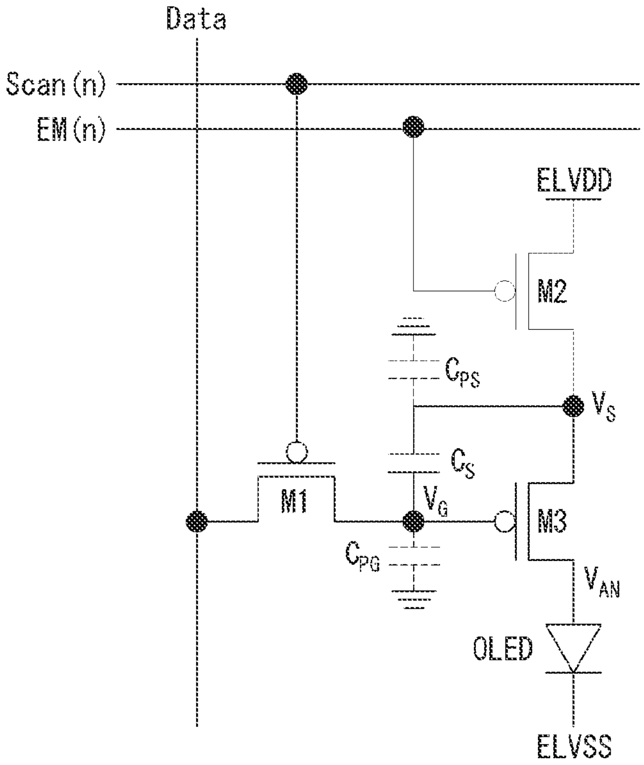
FIG. 13 is a circuit diagram for describing an operating principle of the pixel circuit of FIG. 9 in the data input period.
Figure 14:
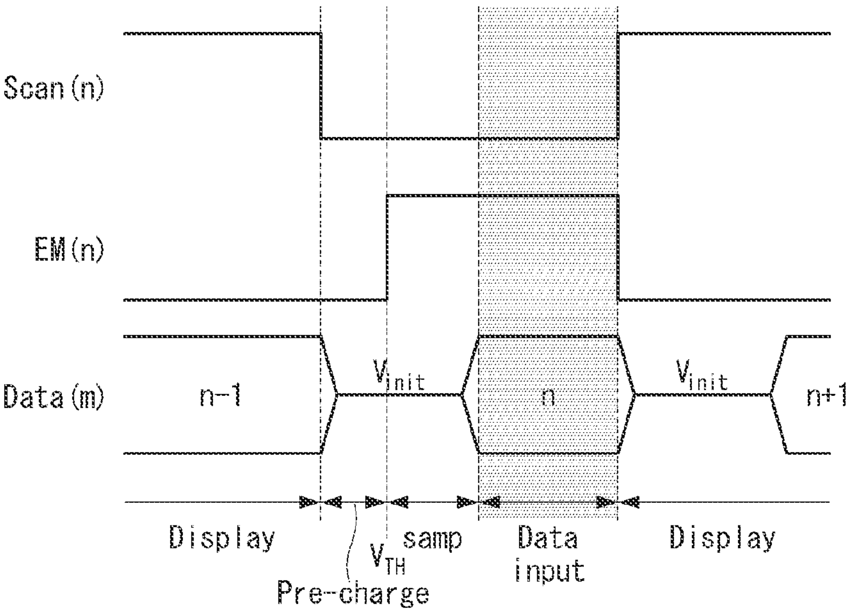
FIG. 14 is a timing diagram for describing an operating principle of the pixel circuit of FIG. 13 in the data input period.

FIG. 13 is a circuit diagram for describing an operating principle of the pixel circuit of FIG. 9 in the data input period. FIG. 14 is a timing diagram for describing an operating principle of the pixel circuit of FIG. 13 in the data input period.

Referring to FIGS. 13 and 14, in the data input period, while the scan signal is maintained at a low level and the emission signal is maintained at a high level, an n-th data signal applied through the m-th data line is supplied through the first transistor M1.

At this time, coupling occurs by parasitic capacitors seen at the gate voltage $V_G$ node and the source voltage $V_S$ node. The source voltage $V_S$ of the source voltage node may be expressed as Equation 3 below by the data voltage $V_{DATA}$ supplied through the first transistor M1.

$$V_S = V_{Init} + |V_{TH}| + \frac{C_S}{C_S + C_{PS}}(V_{Data} - V_{Init}) \qquad \text{[Equation 3]}$$

Figure 15:
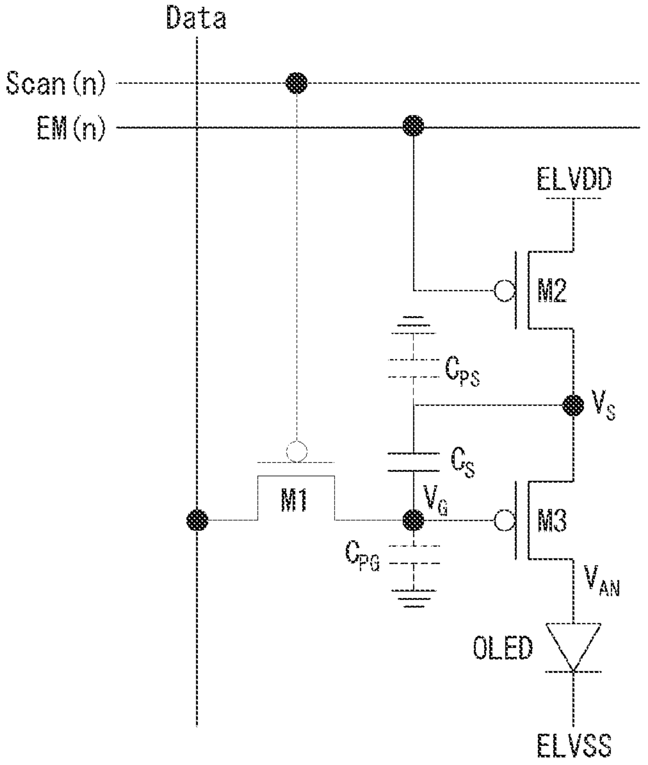
FIG. 15 is a circuit diagram for describing an operating principle of the pixel circuit of FIG. 9 in the display period.
Figure 16:
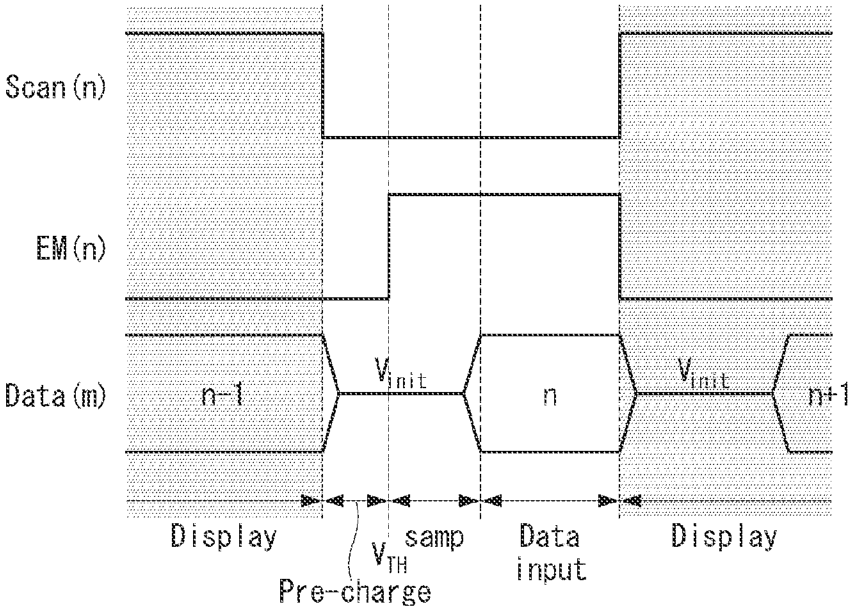
FIG. 16 is a timing diagram for describing an operating principle of the pixel circuit of FIG. in the display period.

FIG. 15 is a circuit diagram for describing an operating principle of the pixel circuit of FIG. 9 in the display period. FIG. 16 is a timing diagram for describing an operating principle of the pixel circuit of FIG. 15 in the display period.

Referring to FIGS. 15 and 16, in the display period, as the scan signal is converted from a low level to a high level and the emission signal is converted from a high level to a low level, the first transistor M1 is turned off, the second transistor M2 is turned on, and the third transistor M3 maintains a turned-on state.

At this time, coupling occurs by parasitic capacitors seen at the gate voltage $V_G$ node and the source voltage $V_S$ node. In addition, the gate voltage $V_G$ of the gate voltage node may be expressed as Equation 4 below by the first power supply voltage ELVDD supplied through the second transistor M2.

$$V_G = V_{Data} + \frac{C_S}{C_S + C_{PG}}\left(ELVDD - \left(V_{Init} + |V_{TH}| + \frac{C_S}{C_S + C_{PS}}(V_{Data} - V_{Init})\right)\right) \qquad \text{[Equation 4]}$$

In addition, a current $I_{EM}$ flowing through the light emitting device OLED may be expressed as Equation 5 below.

$$I_{EM} = \mu_n C_{OX}\frac{W}{L}\left(\left(1 - \frac{C_S}{C_S + C_{PG}}\frac{C_S}{C_S + C_{PS}}\right)V_{Data} - \frac{C_{PS}}{C_S + C_{PS}}\frac{C_S}{C_S + C_{PG}}V_{Init} + \frac{C_{PG}}{C_S + C_{PG}}|V_{TH}| - \frac{C_{PG}}{C_S + C_{PG}}ELVDD\right)^2 \qquad \text{[Equation 5]}$$

As shown in Equation 5 above, it can be seen that the threshold voltage component is reduced to $C_{PG}/(Cs+C_{PG})$. In particular, since a capacitance of the capacitor Cs is about 10 times greater than a capacitance of the parasitic capacitor $C_{PG}$, it may be confirmed that the influence of the threshold voltage $V_{TH}$ on the current flowing through the light emitting device is greatly reduced.

Figure 17:
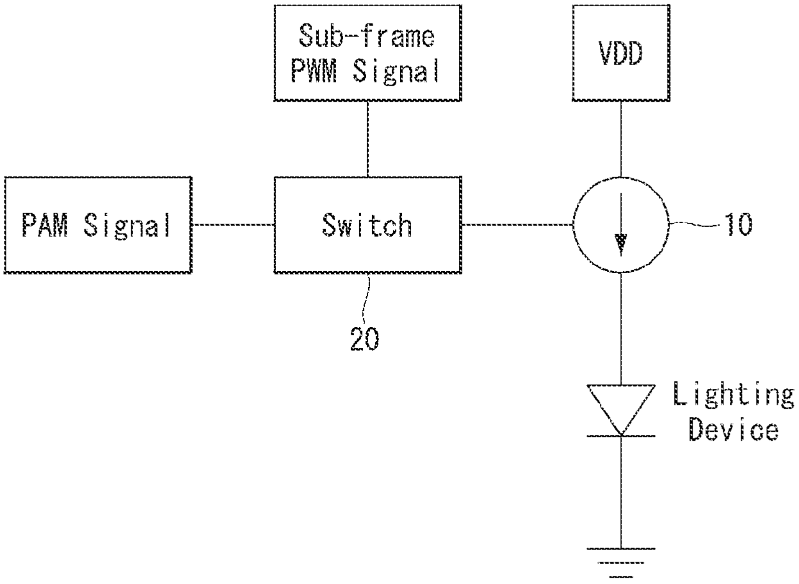
FIG. 17 is a schematic block diagram for describing a method of driving a pixel circuit according to another exemplary embodiment of the present disclosure.

FIG. 17 is a schematic block diagram for describing a method of driving a pixel circuit according to another exemplary embodiment of the present disclosure.

Referring to FIG. 17, the method of driving a pixel circuit is configured to supply a current corresponding to a desired brightness or grayscale to a light emitting device connected in series with a current source 10 between a first power supply voltage VDD and a second power supply voltage. The current source 10 may correspond to the third transistor of the pixel circuit of FIG. 9. In addition, the current source 10 may correspond to the driving transistor of the basic pixel circuit of FIG. 1. This current source may include a thin film transistor or a field effect transistor. In addition, the first power supply voltage VDD and the second power supply voltage correspond to the first power supply voltage ELVDD and the second power supply voltage ELVSS of FIG. 9, respectively, and the second power supply voltage may include a ground potential.

In order to drive the pixel circuit, the pixel circuit includes a switch 20 configured to adjust a signal level for controlling the current supplied from the current source 10 to the light emitting device. In this exemplary embodiment, the switch 20 may include a semiconductor transistor or a thin film transistor.

In particular, the switch 20 may be configured to be turned on for a predetermined period of time determined according to a sub-frame PWM signal (hereinafter, briefly referred to as a 'PWM signal') having a plurality of sub-frames during one frame or one frame time for driving the light emitting device once.

In addition, the switch 20 may be configured to apply any one PAM signal selected from at least a plurality of different pulse amplitude modulation (PAM) signals to the current source 10 for a predetermined period of time according to a pulse width modulation (PWM) signal.

The PAM signal is a data signal and is used to control the operation of the current source so that the current source 10 supplies current with an intensity or level corresponding to a specific luminance or specific grayscale to the light emitting device.

The aforementioned switch 20 is the simplest and most suitable means for controlling the current source 10, and when the operation of the aforementioned switch 20 is able to be performed, it may be variously modified or replaced with another switch circuit, a control signal generation circuit, or a control structure. For example, the switch 20 may correspond to the first transistor M1 of the pixel circuit of FIG. 9.

More specifically, a hybrid driving method among driving methods of a pixel circuit may be configured such that the switch (see 20 in FIG. 17) of the pixel circuit coupled to the light emitting device is operated by a PWM signal having three PAM driving current levels and four sub-frames in a single frame, for example, a PWM switching control signal.

Here, each of the four sub-frames may have a PWM signal form in which any one of the three PAM driving current levels is selected. In this case, the hybrid driving method may express a specific grayscale of a ternary number determined by the sum of each product of three PAM driving current levels and four sub-frames of the PWM signal.

The three PAM driving current levels may be generated corresponding to data voltages $V_{DATA0}$, $V_{DATA1}$, and $V_{DATA2}$ respectively applied to the first terminal of the switch by three data sources $D_{ATA0}$, $D_{ATA1}$, and $D_{ATA2}$ by a data driver. These different levels of data voltages $V_{DATA0}$, $V_{DATA1}$, and $V_{DATA2}$ may be generated and supplied by the data driver applying a predetermined voltage, current, or data signal through at least one specific data line connected to the first terminal of the switch.

The four sub-frames may be configured in a binary weighted from. For example, the four sub-frames may be configured such that a time corresponding to a power of 2 sequentially increases based on a sub-frame of a lowest bit (LSB sub-frame) within a single frame time (1 frame time). In this case, a sub-frame of a highest bit (MSB sub-frame) in a single frame may have a sub-frame time of 23, and the sub-frame of the lowest bit may have a sub-frame time of 20. A scan time may be disposed between each of the four sub-frames, but depending on driving methods, the scan time may overlap the sub-frame time. The plurality of sub-frames may be generated and supplied by a scan driver applying a predetermined voltage, current, or scan signal through at least one specific scan line connected to a control terminal of the switch.

Figure 18:
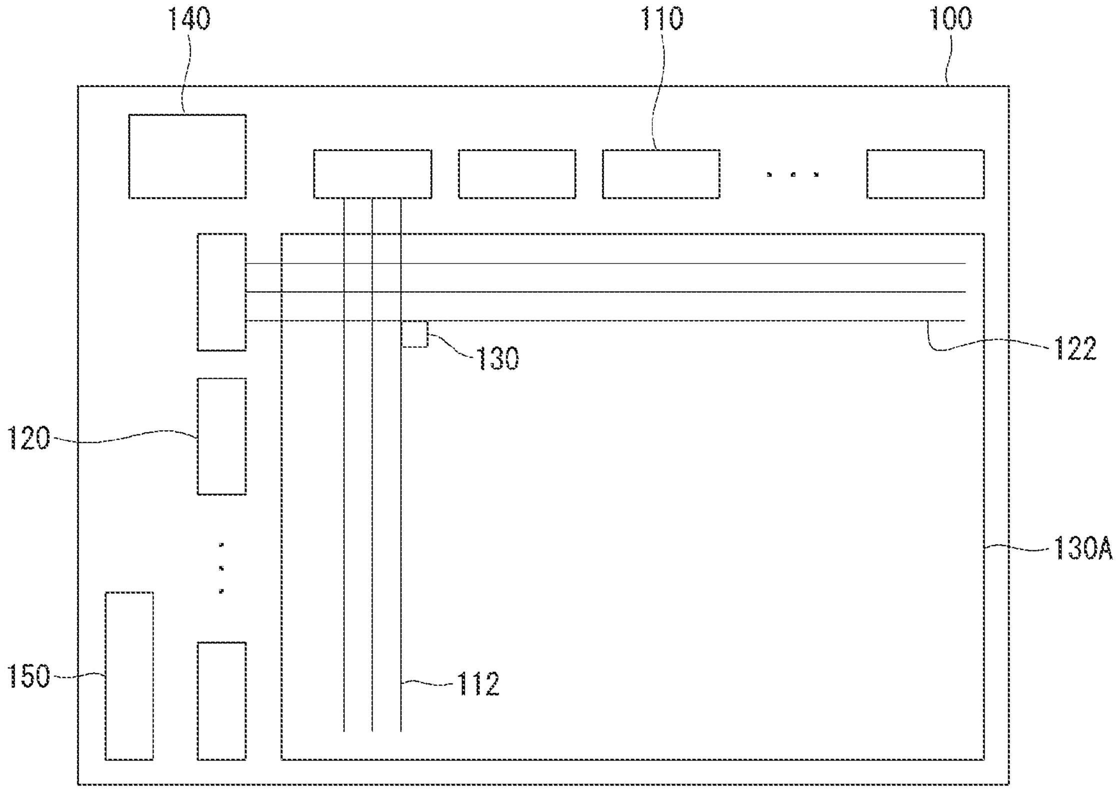
FIG. 18 is a schematic plan view of a display panel including a pixel circuit according to still another exemplary embodiment of the present disclosure.

The aforementioned data driver and scan driver may be some components of a display module (see 100 of FIG. 18). The display panel may include a pixel unit (see 130A of FIG. 18) in which a plurality of pixel circuits each operated by the data driver and the scan driver are arranged in a matrix form. In addition, the first terminal of the switch of the pixel circuit is connected to a data line connected to the data driver, the control terminal of the switch is connected to a scan line connected to the scan driver, and a second terminal of the switch is connected to the current source (see 10 in FIG. 17) that supplies a current corresponding to a desired grayscale to the light emitting device. The current source may be referred to as a driving transistor and may have a thin film transistor structure.

As described above, according to the present exemplary embodiment, not only the pixel circuit of FIG. 9, but also the basic pixel circuit including two transistors and one capacitor and the like may effectively express a desired grayscale while minimizing an effect on characteristic variation of the driving transistor.

Meanwhile, in the present exemplary embodiment, a plurality of PAM signal levels applied to the first terminal of the first transistor M1 of the pixel circuit through the data line are described as three levels, and a plurality of PWM sub-frames applied to the gate terminal of the first transistor M1 through scan line are described as four sub-frames, but the present disclosure is not limited to such a configuration, and it may be configured using at least two or more PAM signal levels and at least two or more sub-frames.

FIG. 18 is a schematic plan view of a display panel including a pixel circuit according to still another exemplary embodiment of the present disclosure.

Referring to FIG. 18, a display panel 100 may include a data driver 110, a gate driver 120, a pixel unit 130A, a timing controller 140, and a power supply 150. The gate driver 120 may be referred to as a scan driver.

The pixel unit 130A includes a plurality of pixels 130 located near intersections in which data lines 112 connected to the data driver 110 and scan lines 122 connected to the gate driver 120 intersect. Each of the plurality of pixels 130 may include the basic pixel circuit illustrated in FIG. 1, or the pixel circuit previously described with reference to FIG. 9. Each pixel may correspond to any one of a unit pixel configuring the pixel unit 130A of the display device or a sub-pixel belonging to the unit pixel.

The data driver 110 may be configured as a plurality and may be arranged at one side edge of the pixel unit 130A. The data driver 110 may include the plurality of data lines 112 extending into the pixel unit 130A in a first direction, and may supply a data signal to the pixel circuit of each pixel 130 through each data line. The data signal may include a pulse amplitude modulation (PAM) signal of any one level selected from the PAM signals having at least two or more different levels.

The gate driver 120 may be configured as a plurality and may be arranged at another side edge of the pixel unit 130A. The gate driver 120 may include the plurality of scan lines 122 extending into the pixel unit 130A in a second direction substantially orthogonal to the first direction, and may supply a scan signal to the pixel circuit of each pixel 130 through each scan line.

The scan signal may include a pulse width modulation (PWM) signal having a plurality of sub-frames smaller than the number of bits for grayscale data to be expressed, but is not limited thereto. When a desired grayscale is expressed by a plurality of levels of the data driver, the scan signal may have a single frame shape not including sub-frames.

The timing controller 140 controls operation timings of the data driver 110 and the gate driver 120. The timing controller 140 may transmit a PAM signal to the data driver 110 based on an input image signal of each frame, and may transmit a PWM signal to the gate driver 120.

The power supply 150 is a component that may be optionally included, and may include its own power source such as a battery or may be connected to an external commercial power source, and may supply power required for the data driver 110, the gate driver 120, the pixel unit 130A, and the timing controller 140.

The aforementioned display panel may be referred to as a display module, which is a finished product as a component or a device, or may be interpreted as a device including some components of the display module. The display module may be referred to as a display device, an image display device, an image output device, and optical output device, and the like.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A pixel circuit configured to supply a current to a light emitting device so that the light emitting device emits light of a desired grayscale, the pixel circuit comprising:

a first transistor having a first terminal connected to a data line and to which a data signal is applied and a gate terminal connected to a scan line and to which a scan signal is applied;

a third transistor having a gate terminal connected to a second terminal of the first transistor and a second terminal connected to the light emitting device;

a capacitor having a second terminal commonly connected to the second terminal of the first transistor and the gate terminal of the third transistor; and a second transistor having a second terminal commonly connected to a first terminal of the capacitor and a first terminal of the third transistor, a first terminal connected to a first power supply voltage, and a gate terminal connected to an emission line to which an emission signal is applied, wherein, in a pre-charge period of a single operation cycle period, a gate voltage node of the third transistor is charged with an initial voltage, and a source voltage node of the third transistor is charged with the first power supply voltage, and wherein, in a data input period following a threshold voltage sampling period of the single operation cycle period, the first transistor maintains a turned-on state by the scan signal, the second transistor maintains a turned-off state by the emission signal, the data signal is applied to the gate terminal of the third transistor through the first transistor and the third transistor maintains a turned-off state and coupling occurs by parasitic capacitors seen at the gate voltage node and the source voltage node.

2. The pixel circuit of claim 1, wherein, in the pre-charge period of a single operation cycle period, the first transistor is turned on by the scan signal and the second transistor maintains a turned-on state by the emission signal.

3. The pixel circuit of claim 2, wherein, in the threshold voltage sampling period following the pre-charge period of the single operation cycle period, the first transistor maintains a turned-on state by the scan signal, the second transistor is turned off by the emission signal, and the source voltage node is discharged by a source follower until a voltage corresponding to a sum of absolute values of the initial voltage and the threshold voltage is reached or until the third transistor is turned off.

4. The pixel circuit of claim 3, wherein, in the data input period following the threshold voltage sampling period of the single operation cycle period, the source voltage node is charged with a source voltage reflecting the coupling by a data voltage supplied through the first transistor.

5. The pixel circuit of claim 4, wherein, in a display period following the data input period of the single operation cycle period, the first transistor is turned off by the scan signal, the second transistor is turned on by the emission signal, the coupling occurs by the parasitic capacitors seen at the gate voltage node and the source voltage node, and a gate voltage of the gate voltage node becomes a voltage reflecting two parasitic capacitor components at both ends of the capacitor by the first power supply voltage supplied through the second transistor.

6. The pixel circuit of claim 5, wherein a current flowing through the light emitting device according to the gate voltage has a coefficient having a sum of the capacitor and the parasitic capacitor as a denominator and the parasitic capacitor as a numerator in a threshold voltage component of the third transistor in an equation expressing the current.

7. The pixel circuit of claim 1, wherein the light emitting device includes at least one or more of an OLED, a micro-LED, and a QLED.

8. A method of driving a pixel circuit configured to supply a current to a light emitting device so that the light emitting device emits light of a desired grayscale, the pixel circuit comprising: a first transistor having a first terminal connected to a data line and to which a data signal is applied and a gate terminal connected to a scan line and to which a scan signal is applied; a third transistor having a gate terminal connected to a second terminal of the first transistor and a second terminal connected to the light emitting device; a capacitor having a second terminal commonly connected to the second terminal of the first transistor and the gate terminal of the third transistor; and a second transistor having a second terminal commonly connected to a first terminal of the capacitor and a first terminal of the third transistor, a first terminal connected to a first power supply voltage, and a gate terminal connected to an emission line to which an emission signal is applied, the method comprising:

charging a gate voltage node of the third transistor with an initial voltage, and charging a source voltage node of the third transistor with the first power supply voltage;

in a state in which the second transistor is turned off, discharging a source voltage of the source voltage node by a source follower until a voltage corresponding to a sum of absolute values of the initial voltage and the threshold voltage is reached or until the third transistor is turned off; and in a state in which the third transistor is turned off, when coupling occurs by parasitic capacitors seen at the gate voltage node and the source voltage node, charging the source voltage node with a source voltage reflecting the coupling between the capacitor and the parasitic capacitor by a data voltage supplied through the first transistor.

9. The method of claim 8, further comprising:

in a state in which the first transistor is turned off and the second transistor is turned on, when the coupling occurs by the parasitic capacitors seen at the gate voltage node and the source voltage node, causing a gate voltage of the gate voltage node to be a voltage reflecting the coupling by two parasitic capacitors of both ends of the capacitor by the first power supply voltage supplied through the second transistor.

10. The method of claim 8, wherein the light emitting device includes at least one or more of an OLED, a micro-LED, and a QLED.

11. A display panel configured to output an image, the display panel comprising:

a pixel unit in which a plurality of pixels are arranged; and a pixel circuit provided in a first pixel among the pixels, and configured to supply a current to a light emitting device so that the light emitting device belonging to the first pixel emits light of a desired grayscale, wherein the pixel circuit comprises:

a first transistor having a first terminal connected to a data line and to which a data signal is applied and a gate terminal connected to a scan line and to which a scan signal is applied;

a third transistor having a gate terminal connected to a second terminal of the first transistor and a second terminal connected to the light emitting device;

a capacitor having a second terminal commonly connected to the second terminal of the first transistor and the gate terminal of the third transistor; and a second transistor having a second terminal commonly connected to a first terminal of the capacitor and a first terminal of the third transistor, a first terminal connected to a first power supply voltage, and a gate terminal connected to an emission line to which an emission signal is applied, wherein, in a pre-charge period of a single operation cycle period, a gate voltage node of the third transistor is charged with an initial voltage, and a source voltage node of the third transistor is charged with the first power supply voltage, and wherein, in a data input period following a threshold voltage sampling period of the single operation cycle period, the first transistor maintains a turned-on state by the scan signal, the second transistor maintains a turned-off state by the emission signal, the data signal is applied to the gate terminal of the third transistor through the first transistor and the third transistor maintains a turned-off state and coupling occurs by parasitic capacitors seen at the gate voltage node and the source voltage node.

12. The display panel of claim 11, further comprising:

a data driver configured to supply the data signal to the pixel unit;

a gate driver configured to supply the scan signal to the pixel unit; and a timing controller configured to control operations of the data driver and the gate driver.

13. The display panel of claim 12, wherein the data driver applies, as the data signal, a pulse amplitude modulation (PAM) signal having a plurality of levels to the first terminal of the first transistor according to a grayscale required for the light emitting device coupled to each pixel.

14. The display panel of claim 13, wherein the gate driver applies, as the scan signal, a pulse width modulation (PWM) signal having a plurality of sub-frames in a single frame according to the grayscale to a control terminal of the first transistor, and a PAM signal of any one level selected from the PAM signal is applied to the gate terminal of the third transistor configured to supply a grayscale current to the light emitting device during a corresponding sub-frame.

15. The display panel of claim 13, wherein the number of output channels of a decoder provided in the data driver is smaller than the number of grayscales that is expressed with predetermined bits.

16. The display panel of claim 11, wherein, in the pre-charge period of a single operation cycle period of the first pixel, the first transistor is turned on by the scan signal and the second transistor maintains a turned-on state by the emission signal.

17. The display panel of claim 16, wherein, in the threshold voltage sampling period following the pre-charge period of the single operation cycle period, the first transistor maintains a turned-on state by the scan signal, the second transistor is turned off by the emission signal, and the source voltage node is discharged by a source follower until a voltage corresponding to a sum of absolute values of the initial voltage and the threshold voltage is reached or until the third transistor is turned off.

18. The display panel of claim 17, wherein, in the data input period following the threshold voltage sampling period of the single operation cycle period, the source voltage node is charged with a source voltage reflecting the coupling with the parasitic capacitor by a data voltage supplied through the first transistor.

19. The display panel of claim 18, wherein, in a display period following the data input period of the single operation cycle period, the first transistor is turned off by the scan signal, the second transistor is turned on by the emission signal, the coupling occurs by the parasitic capacitors seen at the gate voltage node and the source voltage node, and a gate voltage of the gate voltage node becomes a voltage reflecting the coupling at both ends of the capacitor by the first power supply voltage supplied through the second transistor.

20. The display panel of claim 11, wherein the light emitting device includes at least one or more of an OLED, a micro-LED, and a QLED.

* * * * *